(12) United States Patent
Spix et al.

(10) Patent No.: US 8,602,008 B2
(45) Date of Patent: Dec. 10, 2013

(54) POSITIVE CRANKCASE VENTILATION SYSTEM

(75) Inventors: Thomas A. Spix, Rochester Hills, MI (US); Thomas M. Bishop, New Lothrop, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 221 days.

(21) Appl. No.: 13/289,049

(22) Filed: Nov. 4, 2011

(65) Prior Publication Data

US 2013/0112179 A1 May 9, 2013

(51) Int. Cl.
*F02M 25/06* (2006.01)
(52) U.S. Cl.
USPC .......................................................... 123/572
(58) Field of Classification Search
USPC ...................... 123/572–574, 41.86
See application file for complete search history.

(56) References Cited

U.S. PATENT DOCUMENTS

| 8,181,634 B2* | 5/2012 | Spix et al. ...................... 123/572 |
| 8,408,190 B2* | 4/2013 | Spix et al. ...................... 123/572 |
| 2009/0223498 A1* | 9/2009 | Shieh ............................. 123/574 |
| 2010/0101514 A1* | 4/2010 | Hirano et al. .............. 123/41.86 |
| 2011/0073083 A1* | 3/2011 | Shiraishi et al. .............. 123/574 |

* cited by examiner

*Primary Examiner* — M. McMahon
(74) *Attorney, Agent, or Firm* — Quinn Law Group, PLLC

(57) ABSTRACT

An engine assembly includes an engine defining a combustion chamber and a crankcase volume, and an intake assembly having an air cleaner assembly, a throttle, and an intake manifold in a series arrangement and fluidly coupled with the combustion chamber. A first and second air-oil separator may define respective first and second separator volumes, each respectively configured to extract oil from air flowing through the volume. A first conduit may fluidly couple the crankcase with the first separator volume, a second conduit may fluidly couple the intake manifold with the first separator volume; a third conduit may fluidly couple the crankcase with the second separator volume; a fourth conduit may fluidly couple the air cleaner assembly with the second separator volume; and a fifth conduit may fluidly couple the air cleaner assembly with the first separator volume.

13 Claims, 4 Drawing Sheets

POSITIVE CRANKCASE VENTILATION SYSTEM

TECHNICAL FIELD

The present invention relates generally to a positive crankcase ventilation system with air-oil separators configured to extract oil from engine blowby gasses.

BACKGROUND

During engine operation, combustion gas may leak between the cylinder and the corresponding piston rings, and into the engine crankcase. The leaked combustion gas is referred to as blowby gas, and typically includes intake air, unburned fuel, exhaust gas, oil mist, and water vapor. In an effort to ventilate the crankcase and re-circulate the blowby gas to the intake side of the engine, a positive crankcase ventilation (PCV) system may be used.

SUMMARY

An engine assembly includes an engine, which may generally define a combustion chamber and a crankcase volume, and an intake assembly having an air cleaner assembly, a throttle, and an intake manifold in a series arrangement, where the intake manifold is fluidly coupled with the combustion chamber. The throttle may be configured to controllably restrict air flow into the intake manifold. A first and second air-oil separator may define respective first and second separator volumes, each respectively configured to extract oil from air flowing through the volume.

A first conduit may fluidly couple the crankcase with the first separator volume, a second conduit may fluidly couple the intake manifold with the first separator volume; a third conduit may fluidly couple the crankcase with the second separator volume; a fourth conduit may fluidly couple the air cleaner assembly with the second separator volume; and a fifth conduit may fluidly couple the air cleaner assembly with the first separator volume. The fifth conduit may further include a check valve configured to inhibit fluid flow through the fifth conduit in a direction away from the air cleaner assembly. Additionally, the second conduit may include a flow restrictor. The third and fourth conduits may be operative to allow air to pass from the air cleaner assembly into the crankcase.

At least one of the first and third conduits may include a bore extending through a portion of the engine. Additionally, each of the second, fourth and fifth conduits may comprise tubes, which may, for example, have a common inner diameter.

The engine may further include an engine block, a cylinder head, an oil pan, and a cylinder head cover. One or both of the air-oil separators may be disposed within a volume partially defined by the cylinder head and cylinder head cover. Likewise, one or both of air-oil separators may include a baffle extending into the separator volume.

Furthermore, a method of assembling a positive crankcase ventilation system may include coupling a crankcase volume of an engine assembly with a separator volume of a first air-oil separator using a first fluid conduit and coupling the separator volume of the first air-oil separator with an intake manifold of the engine assembly using a second fluid conduit. Additionally, the method may include coupling the crankcase volume of the engine assembly with a separator volume of a second air-oil separator using a third fluid conduit; coupling the separator volume of the second air-oil separator with an air cleaner assembly of the engine assembly using a fourth fluid conduit; and coupling the separator volume of the first air-oil separator with the air cleaner assembly of the engine assembly using a fifth fluid conduit. The fifth fluid conduit may include a check valve configured to inhibit fluid flow through the fifth fluid conduit in a direction away from the air cleaner assembly.

The above features and advantages and other features and advantages of the present invention are readily apparent from the following detailed description of the best modes for carrying out the invention when taken in connection with the accompanying drawings.

DETAILED DESCRIPTION

Figure 1:
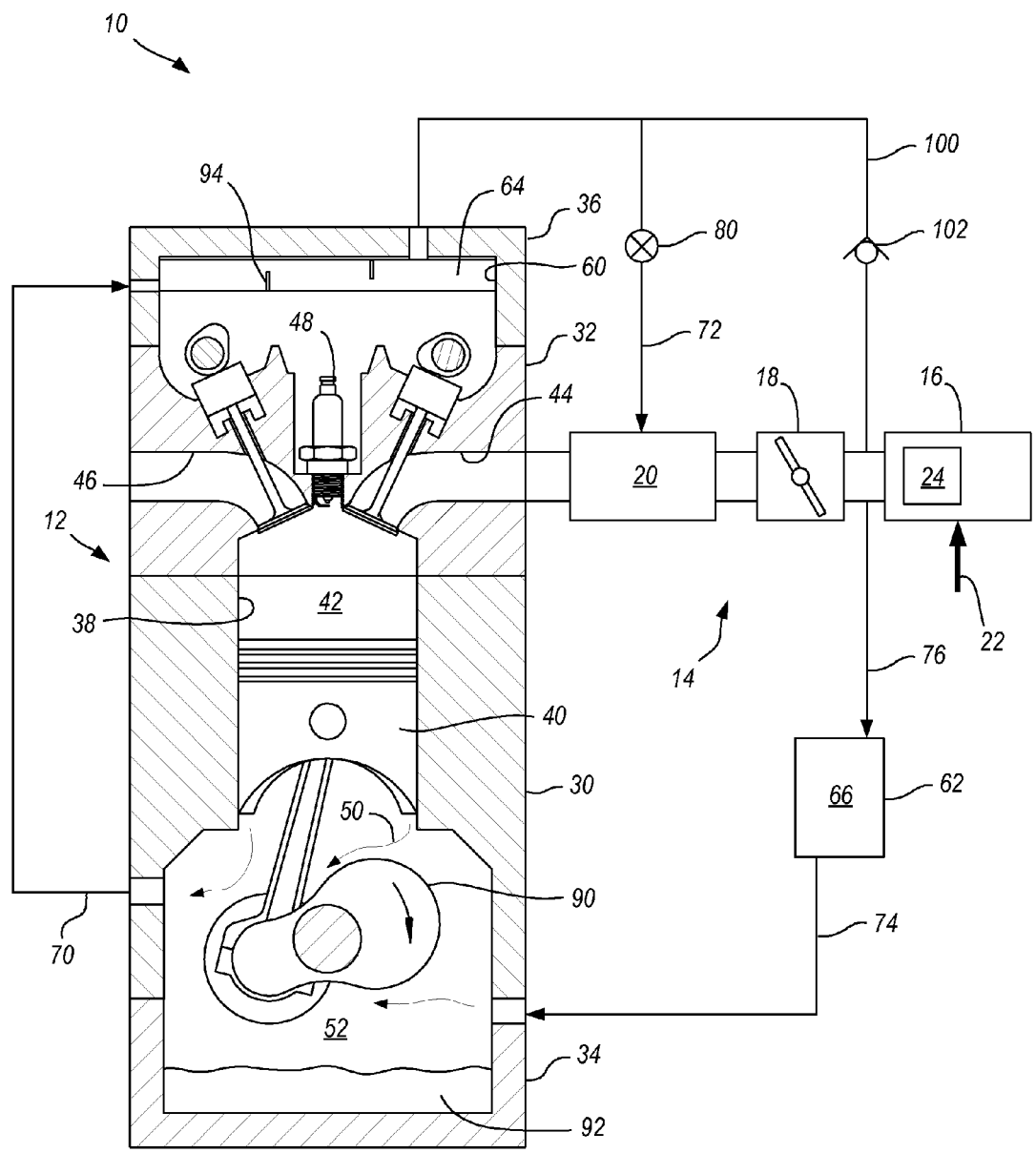
FIG. 1 is a schematic partial cross-sectional illustration of a positive crankcase ventilation system operating with an inline engine assembly under normal operating conditions.

Referring to the drawings, wherein like reference numerals are used to identify like or identical components in the various views, FIG. 1 schematically illustrates an engine assembly 10 having a positive crankcase ventilation system, where the engine assembly 10 includes an engine 12, and an intake assembly 14. The intake assembly 14 may include, for example, an air cleaner assembly 16, a throttle 18, and an intake manifold 20 disposed in a series arrangement. The throttle 18 may be disposed between the air cleaner assembly 16 and the intake manifold 20, and may be configured to selectively restrict the flow of air 22 into the intake manifold 20. The air cleaner assembly 16 may include housings, ports, and/or conduit upstream of the throttle 18. In one configuration, the air cleaner assembly 16 may include, for example, an air filter 24 with a sufficient porosity or other construction to filter airborne debris from the intake air 22 prior to its passage into the intake manifold 20.

The engine 12 may include an engine block 30, a cylinder head 32, an oil pan 34, and an engine cylinder head cover 36. The engine block 30 may define a plurality of cylinder bores 38 (one of which is shown), with each cylinder bore 38 having a reciprocating piston 40 disposed therein. The plurality of cylinder bores 38 may be arranged in any suitable manner, such as, without limitation, a V-engine arrangement, an inline engine arrangement, and a horizontally opposed engine arrangement, as well as using both overhead cam and cam-in-block configurations.

The cylinder head 32, engine block 30, and reciprocating piston 40 may cooperate to define a combustion chamber 42 for each respective cylinder bore 38. Additionally, the cylinder head 32 may provide one or more intake passages 44 and exhaust passages 46 in selective fluid communication with the combustion chamber 42. The intake passage 44 may be used to deliver an air/fuel mixture to the combustion chamber 42 from the intake manifold 20. Following combustion of the air/fuel mixture (such as when ignited by a spark from a spark plug 48), the exhaust passage 46 may carry exhaust gasses out of the combustion chamber 42.

During engine operation, an intake stroke of the piston 40 may draw intake air 22 through the air cleaner assembly 16, past the throttle 18, through the intake manifold 20 and intake passage 44, and into the combustion chamber 42, where fuel may be introduced via fuel injectors (not shown). During the power stroke of the piston 40, following the ignition of the air/fuel mixture in the combustion chamber 42, a portion of the combustion gas may pass between the piston 40 and the engine block 30 (i.e., blowby gas 50) and into the crankcase volume 52 (the crankcase volume 52 being generally defined by the engine 12 via the oil pan 34 and engine block 30). Because the blowby gas 50 includes an amount of un-burnt fuel and products of combustion (such as water vapor), it may be desirable to avoid having these gasses accumulate within the crankcase volume 52. Accordingly, a positive crankcase ventilation system may be used to purge the blowby gas 50 from the crankcase volume 52.

The positive crankcase ventilation system may include a first air-oil separator 60 and a second air oil separator 62, each defining a respective separator volume 64, 66. The first separator volume 64 may be fluidly coupled with the crankcase volume 52 through a first fluid conduit 70, and with the intake manifold 20 through a second fluid conduit 72. Additionally, the second separator volume 66 may be fluidly coupled with the crankcase volume 52 through a third fluid conduit 74, and with the air cleaner assembly 16 through a fourth fluid conduit 76.

During normal operation (excluding wide-open throttle scenarios), the intake stroke of the engine 12 may generate a vacuum in the intake manifold 20 as a result of the throttle 18 partially blocking the intake air flow 22. This vacuum may draw the blowby gas 50 from the crankcase volume 52 through the first air-oil separator volume 64 and into the intake manifold 20 via the first and second fluid conduits 70, 72. A portion of the air used to dilute the blowby gas 50 may be supplied via the third and fourth fluid conduits 74, 76 (and second air-oil separator 62), which may be coupled to the air cleaner assembly 16 upstream of the throttle 18. As such, the pressure differential across the throttle 18 may generate the motive force that may actively vent the crankcase volume 52. During this mode of operation, fresh air may continuously flow through the second air-oil separator volume 66, en-route to the crankcase volume 52. One or more nozzles, restrictor orifices, or valves 80 may be positioned in line with the second fluid conduit 72 to provide generally constant flow under various engine operating conditions.

Due to engine vibrations, motion of the vehicle, the reciprocal motion of the piston 40, and/or the rotating motion of the crankshaft 90, oil 92 contained within the crankcase volume 52 may be splashed, foamed, atomized, misted and/or sprayed within the entire volume of the crankcase 52. This atomized/particulated oil may then be drawn out of the crankcase volume 52 via the first fluid conduit 70, along with the intake air 22 and blowby gas 50. To prevent this atomized oil from being drawn into the intake manifold 20 and back into the combustion chamber 42, the separator volume 64 of the first air-oil separator 60 may be specially configured to separate and remove oil 92 from the flowing gas and allow the oil 92 to drain back into the crankcase volume 52. For example, the separator 60 may include one or more baffles (e.g., baffle 94), fins, or restrictions extending into the separator volume 64 that may aid in separating the oil from the air. These features may aid extraction by, for example, flow redirection or by creating a varying pressure along the flow path. As such, the inertia of the particulated oil may cause the oil to collide with one of the baffles 94 or walls of the separator 60. Once in contact with the wall, the surface tension of the oil may cause it to cling to the wall, where it may subsequently run off (via gravity) toward a drain.

In one configuration, the air-oil separator 60 may be located proximate or within the engine 12, such as, for example, within the cylinder head cover 36. The air-oil separator 60 may comprise a cast aluminum or injection molded component, and may be disposed within a volume defined by the cylinder head cover 36. In another configuration, the air-oil separator 60 may be a fully integrated portion of the cylinder head cover 36. In still another configuration, the air-oil separator 60 may be located apart from the cylinder head cover 36, such as within the crankcase volume 52, within the cylinder head 32, or external to the engine. Depending on the configuration, the first fluid conduit 70 may be, for example, a bore or channel within the engine 12, or may be, for example, a tube that extends between the crankcase volume 52 and the separator 60.

Figure 2:
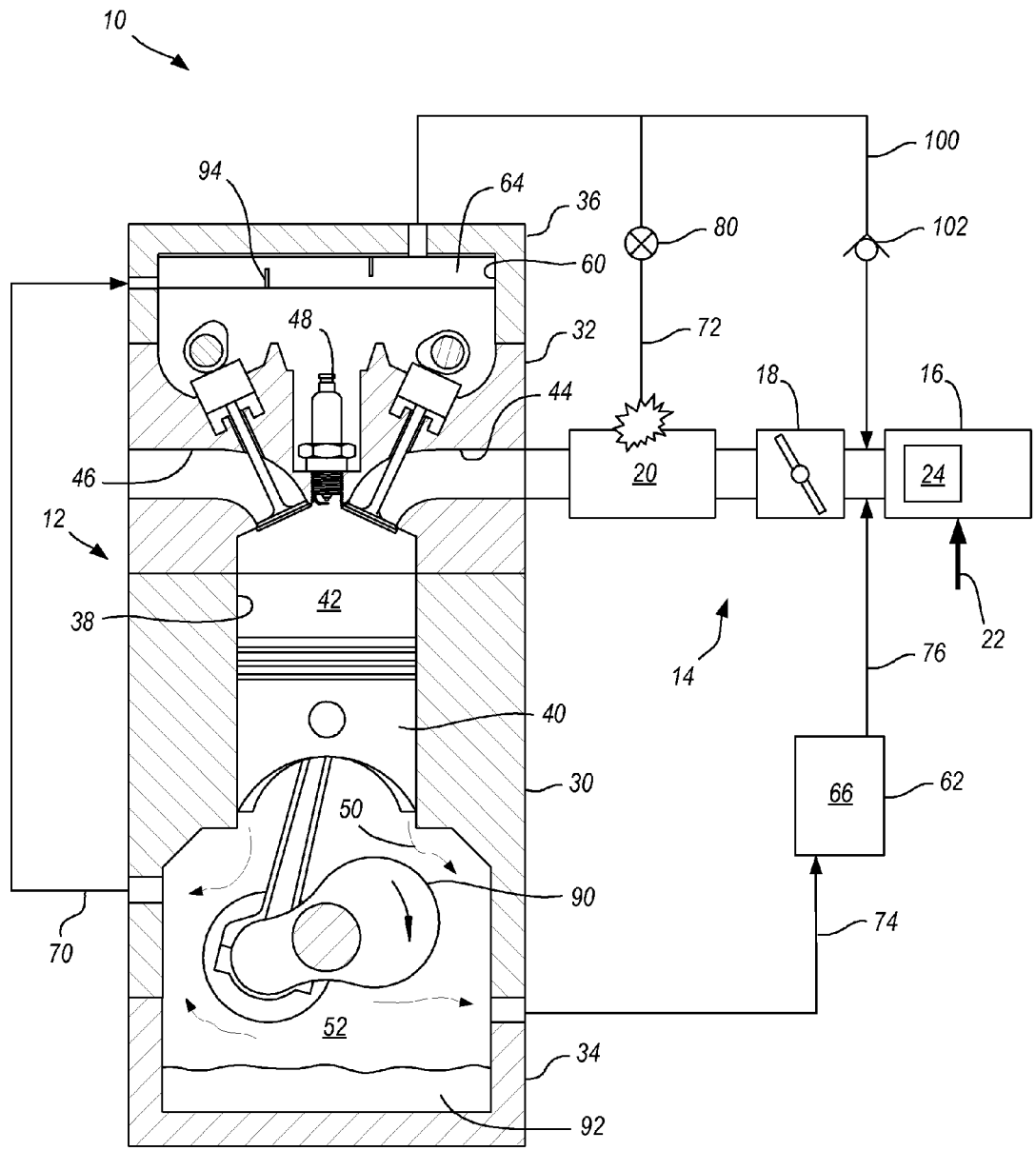
FIG. 2 is a schematic partial cross-sectional illustration of a positive crankcase ventilation system operating with an inline engine assembly in the presence of an obstruction.

In certain cold weather driving situations (e.g., below zero degrees Celsius), water vapor carried by the blowby gas 50 may condense and freeze when introduced into the low pressure, cold, intake manifold 20. While this frozen condensation may be slight, over time it may accumulate and constrict the fluid (gas) flow through the second fluid conduit 72 into the intake manifold 20. As generally illustrated in FIG. 2, when fluid flow through the second fluid conduit 72 is prevented, positively pressured blowby gas 50 (i.e., positive relative to atmospheric conditions) may backflow from the crankcase 52 through third and fourth fluid conduits 74, 76. In this frozen-over/backflowing condition, the second air-oil separator 62 may inhibit oil from flowing into the intake assembly 14 via this fluid path.

The second air-oil separator 62 may be configured in a similar manner as the first air-oil separator 60, and may employ one or more baffles, fins, or restrictions to aid in separating the oil from the air. In one configuration, the second air-oil separator 62 may be disposed within a volume defined by the cylinder head cover 36. Alternatively, it may be integrated into a portion of the engine 12 or intake assembly 14, or may be included as a separate component as shown.

To discourage the fourth fluid conduit 76 from freezing over in the same manner as the first fluid conduit 70, a fifth fluid conduit 100 may fluidly couple the first air-oil separator 60 with the air cleaner assembly 16, i.e., upstream of the throttle 18. By coupling the fifth fluid conduit 100 upstream of the throttle 18, the fifth fluid conduit 100 and the fourth fluid conduit 76 may jointly vent the crankcase volume 52. This dual-hose operation may enable both air-oil separators 60, 62 to jointly extract fluid from the blowby gasses 50, which may provide a more robust system during freezing conditions.

Said another way, if the second fluid conduit 72 becomes obstructed, such as by frozen condensation, the system 10 may automatically switch from a first mode of operation (as generally illustrated in FIG. 1) to a second mode of operation (as generally illustrated in FIG. 2). In this second mode of operation, the venting configuration may provide for increased throughput capacity to properly vent the blowby gasses 50 (which may be desirable in the absence of the fresh air supply to the crankcase volume 52), while also reducing the likelihood of further obstructions.

As further illustrated in FIGS. 1 and 2, the fifth fluid conduit 100 may include a check valve 102 that may only permit unidirectional flow within the fifth fluid conduit 100 in a direction towards the intake assembly 14. By including the check valve 102, during normal operation, fresh air from the air cleaner assembly 16 will be drawn through the crankcase volume 52 by the relatively lower pressure of the intake manifold 20, rather than allowing it to short circuit the crankcase via the fifth fluid conduit 100. In this manner, the check valve 102 eliminates a path of lesser resistance to the intake manifold 20, and renders the fifth fluid conduit 100 generally non-operative during the normal or first mode of operation (i.e., FIG. 1). In the second mode of operation (i.e., FIG. 2), the presence of the obstruction on the second fluid conduit 72, together with the positive pressure of the crankcase volume 52 may cause the check valve 102 to open and allow blowby gasses 50 to pass into the intake assembly 14.

Figure 3:
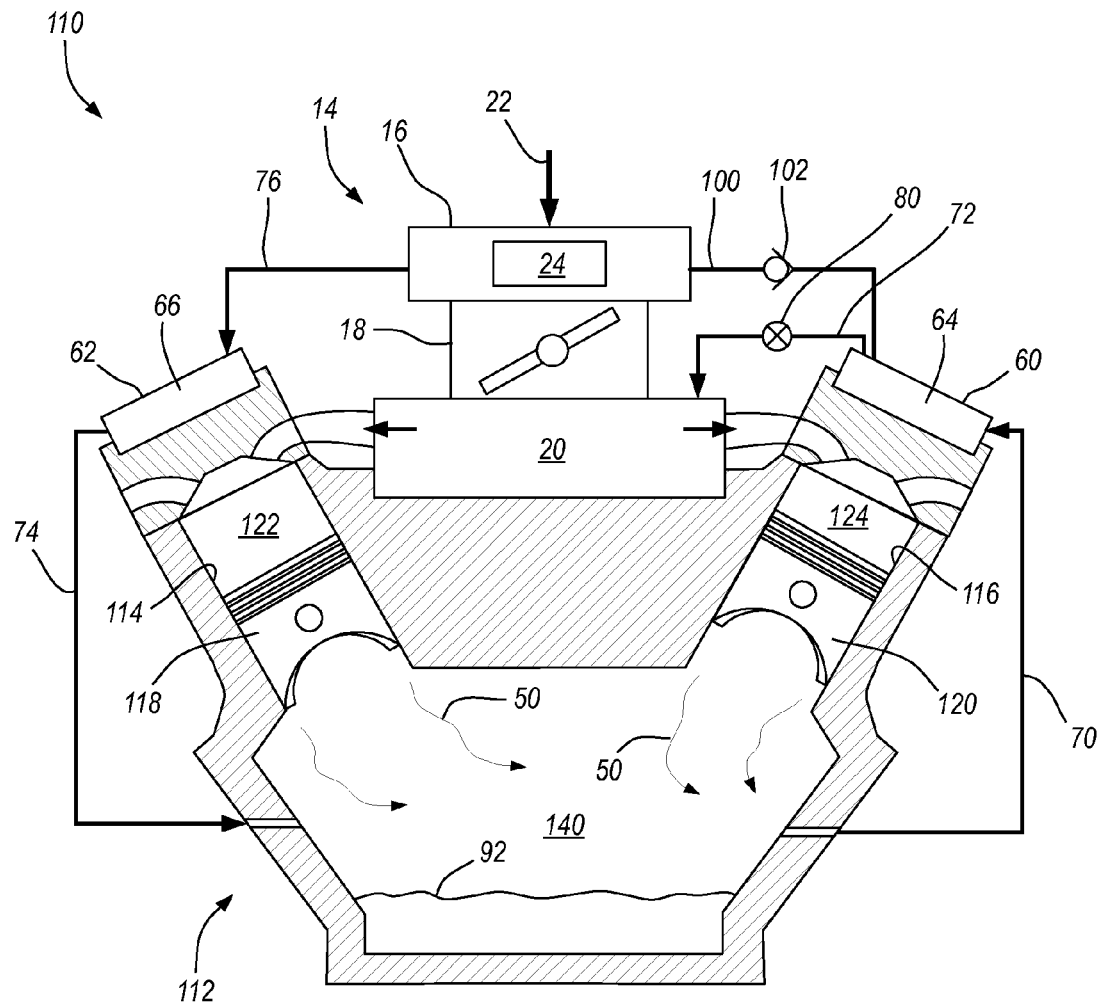
FIG. 3 is a schematic partial cross-sectional illustration of a positive crankcase ventilation system operating with a v-type engine assembly under normal operating conditions.
Figure 4:
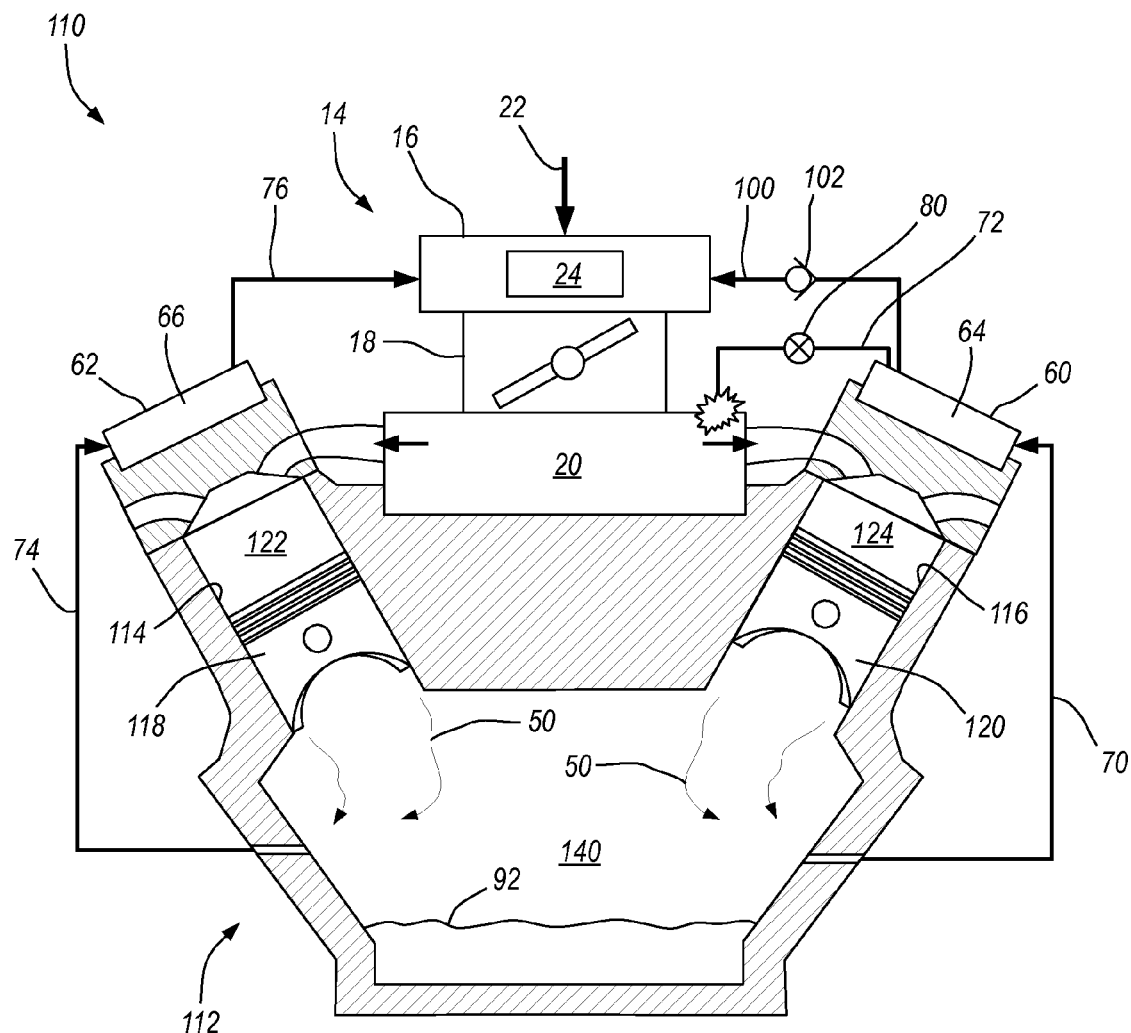
FIG. 4 is a schematic partial cross-sectional illustration of a positive crankcase ventilation system operating with a v-type engine assembly in the presence of an obstruction.

FIGS. 3 and 4 illustrate an engine assembly 110 that is similar to the engine assembly 10 provided in FIGS. 1 and 2, however, engine assembly 110 includes an engine 112 configured in a V-engine arrangement. As shown, the engine 112 is in fluid communication with an intake assembly 14, which may be similar to FIGS. 1-2. It should also be noted that FIGS. 3 and 4 are shown in schematic form, with much of the detail provided in FIGS. 1 and 2 removed for clarity. As generally illustrated, the engine 112 may define at least a first cylinder 114 and a second cylinder 116 disposed in a "V" shaped arrangement relative to each other. Additional cylinders may be provided in line with the first and second cylinders 114, 116, to form, for example, a six or eight cylinder arrangement. A piston 118, 120 may be disposed within each respective cylinder 114, 116, and, together with the engine 112, may define respective combustion chambers 122, 124. The engine 112 may further define a crankcase volume 140, which may contain a crankshaft (not shown) and lubricating oil 92.

Similar to FIGS. 1 and 2, the intake assembly 14 may include, for example, an air cleaner assembly 16, a throttle 18, and an intake manifold 20 disposed in a series arrangement. The throttle 18 may be disposed between the air cleaner assembly 16 and the intake manifold 20, and may be configured to selectively restrict the flow of air 22 into the intake manifold 20. In one configuration, the air cleaner assembly 16 may include an air filter 24. The air filter 24 may have a sufficient porosity or other construction to filter airborne debris from the intake air 22 prior to its passage into the intake manifold 20. During the power stroke of the respective pistons 118, 120, following the ignition of the air/fuel mixture in the combustion chambers 122, 124, a portion of the combustion gas may pass by the respective pistons 118, 120, and into the crankcase 140 (i.e., blowby gas 50).

A positive crankcase ventilation system may be used to purge the blowby gas 50 from the crankcase volume 140. The positive crankcase ventilation system may include a first air-oil separator 60 and a second air oil separator 62, each defining a respective separator volume 64, 66. The first separator volume 64 may be fluidly coupled with the crankcase volume 140 through a first fluid conduit 70 and with the intake manifold 20 through a second fluid conduit 72. Additionally, the second separator volume 66 may be fluidly coupled with the crankcase volume 140 through a third fluid conduit 74 and with the air cleaner assembly 16 through a fourth fluid conduit 76.

In the same manner as described above with respect to FIGS. 1 and 2, during a first, normal mode of operation (excluding wide-open-throttle conditions) as illustrated in FIG. 3, fresh intake air 22 may be drawn through the crankcase volume 140, by the pressure differential established across the throttle 18. As such the lower pressured intake manifold 20 may draw air through the first, second, third, and fourth fluid conduits 70, 72, 74, 76 from the higher pressured air cleaner assembly 16. After the vented blowby gasses 50 exit the crankcase volume 140, they may pass through the first air-oil separator volume 64, which may be specially configured to separate suspended oil from the flowing gasses. The second fluid conduit 72 may include one or more nozzles, valves, or restrictor orifices 80 to provide generally constant flow under various engine operating conditions.

Should the second fluid conduit 72 become obstructed, such as when water vapor collects and freezes at the juncture of the second fluid conduit 72 and a cold intake manifold 20, the positive crankcase ventilation system may automatically adapt to a second mode of operation as illustrated in FIG. 4. In the second mode of operation, positively pressured blowby gas 50 (i.e., positive relative to atmospheric conditions) may backflow from the crankcase 140 through third and fourth fluid conduits 74, 76. In this mode of operation, the second air-oil separator 62 may inhibit oil from flowing into the intake assembly 14 via this fluid path. Additionally, a fifth fluid conduit 100 may fluidly couple the first air-oil separator 60 with the air cleaner assembly 16 to further aid in venting the crankcase volume 52 during this second, obstructed mode of operation.

In an embodiment, the first air-oil separator 60 may be adjacent or integrated within a cylinder head associated with cylinder 116, and the second air-oil separator 62 may be adjacent or integrated within a cylinder head associated with cylinder 114. In an embodiment, each of the first and third fluid conduits 70, 74, respectively coupling the first and second air-oil separators 60, 62 with the crankcase volume 140, may be passageways provided within the walls or structure of the engine 112. In another embodiment, each of the first and third fluid conduits 70, 74 may be tubes or passageways provided external to the engine 112. Additionally, the second, fourth and fifth conduits 72, 76, 100 may be tubes that, for example, may have a common inner diameter.

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. An engine assembly comprising:
an engine defining a combustion chamber and a crankcase volume;
an intake assembly including an air cleaner assembly, a throttle, and an intake manifold disposed in a series arrangement, the intake manifold being fluidly coupled with the combustion chamber, and wherein the throttle is disposed between the air cleaner assembly and the intake manifold;
a first air-oil separator defining a first separator volume, and a second air-oil separator defining a second separator volume, each of the first and second separator volumes being respectively configured to extract oil from air flowing through the volume;
a first conduit fluidly coupling the crankcase with the first separator volume;
a second conduit fluidly coupling the intake manifold with the first separator volume;
a third conduit fluidly coupling the crankcase with the second separator volume;

a fourth conduit fluidly coupling the air cleaner assembly with the second separator volume;

a fifth conduit fluidly coupling the air cleaner assembly with the first separator volume; and wherein the fifth conduit includes a check valve configured to inhibit fluid flow through the fifth conduit in a direction away from the air cleaner assembly.

2. The engine assembly of claim 1, wherein the second conduit includes a flow restrictor.

3. The engine assembly of claim 1, wherein the throttle is configured to controllably restrict air flow into the intake manifold.

4. The engine assembly of claim 1, wherein the engine includes an engine block, a cylinder head, an oil pan, and a cylinder head cover; and wherein the first air-oil separator is disposed within a volume partially defined by the cylinder head and cylinder head cover.

5. The engine assembly of claim 1, wherein the third and fourth conduits are operative to allow air to pass from the air cleaner assembly into the crankcase.

6. The engine assembly of claim 1, wherein the first air-oil separator includes a baffle extending into the separator volume.

7. The engine assembly of claim 1, wherein the air cleaner assembly includes an air filter.

8. The engine assembly of claim 1, wherein at least one of the first and third conduits includes a bore extending through a portion of the engine.

9. The engine assembly of claim 1, wherein each of the second, fourth and fifth conduits are tubes.

10. The engine assembly of claim 9, wherein each of the second, fourth and fifth conduit tubes have a common inner diameter.

11. An engine assembly comprising:

an engine defining a combustion chamber and a crankcase volume;

an intake assembly including an air cleaner assembly, a throttle, and an intake manifold disposed in a series arrangement, the intake manifold being fluidly coupled with the combustion chamber, and wherein the throttle is disposed between the air cleaner assembly and the intake manifold and is configured to controllably restrict air flow into the intake manifold;

a first air-oil separator defining a first separator volume, and a second air-oil separator defining a second separator volume, each of the first and second separator volumes being respectively configured to extract oil from air flowing through the volume;

a first conduit fluidly coupling the crankcase with the first separator volume;

a second conduit fluidly coupling the intake manifold with the first separator volume, the second conduit including a flow restrictor;

a third conduit fluidly coupling the crankcase with the second separator volume;

a fourth conduit fluidly coupling the air cleaner assembly with the second separator volume;

a fifth conduit fluidly coupling the air cleaner assembly with the first separator volume; and wherein the fifth conduit includes a check valve configured to inhibit fluid flow through the fifth conduit in a direction away from the air cleaner assembly.

12. A method of assembling a positive crankcase ventilation system comprising:

coupling a crankcase volume of an engine assembly with a separator volume of a first air-oil separator using a first fluid conduit;

coupling the separator volume of the first air-oil separator with an intake manifold of the engine assembly using a second fluid conduit;

coupling the crankcase volume of the engine assembly with a separator volume of a second air-oil separator using a third fluid conduit;

coupling the separator volume of the second air-oil separator with an air cleaner assembly of the engine assembly using a fourth fluid conduit; and coupling the separator volume of the first air-oil separator with the air cleaner assembly of the engine assembly using a fifth fluid conduit, the fifth fluid conduit including a check valve configured to inhibit fluid flow through the fifth fluid conduit in a direction away from the air cleaner assembly.

13. The method of claim 12, wherein the intake manifold is fluidly coupled with a combustion chamber of the engine assembly, and wherein a throttle is disposed between the air cleaner assembly and the intake manifold and is configured to controllably restrict air flow into the intake manifold.

* * * * *